United States Patent
Grampassi

(10) Patent No.: US 9,314,043 B2
(45) Date of Patent: Apr. 19, 2016

(54) MOVEMENT DEVICE INCLUDING A FRONTAL BLADE FOR MOVING PRODUCTS, IN PARTICULAR FOR FLUID AND/OR PASTY PRODUCTS

(75) Inventor: Enrico Grampassi, Spilamberto (IT)

(73) Assignee: S.P.M. DRINK SYSTEMS S.P.A., Spilamberto (MO) (IT)

( * ) Notice: Subject to any disclaimer, the term of this patent is extended or adjusted under 35 U.S.C. 154(b) by 972 days.

(21) Appl. No.: 13/518,612

(22) PCT Filed: Dec. 22, 2010

(86) PCT No.: PCT/IB2010/056030
§ 371 (c)(1),
(2), (4) Date: Jun. 22, 2012

(87) PCT Pub. No.: WO2011/077396
PCT Pub. Date: Jun. 30, 2011

(65) Prior Publication Data
US 2012/0272834 A1    Nov. 1, 2012

(30) Foreign Application Priority Data
Dec. 23, 2009   (IT) .............................. MO2009A0310

(51) Int. Cl.
*B01F 15/00*   (2006.01)
*A23G 9/22*    (2006.01)
*A23G 9/04*    (2006.01)

(52) U.S. Cl.
CPC ................ *A23G 9/224* (2013.01); *A23G 9/045* (2013.01); *B01F 15/00058* (2013.01)

(58) Field of Classification Search
CPC ......... A23G 9/224; A23G 9/045; A23G 9/04; A23G 9/22; B01F 15/00019; B01F 15/00058; B01F 15/0298
USPC ...................... 366/310, 312, 313; 62/342–343
See application file for complete search history.

(56) References Cited

U.S. PATENT DOCUMENTS

| 4,201,558 A | * | 5/1980 | Schwitters et al. ............... 62/70 |
| 4,900,158 A | * | 2/1990 | Ugolini ......................... 366/143 |
| 5,074,125 A | * | 12/1991 | Schifferly ....................... 62/342 |
| 5,603,229 A | * | 2/1997 | Cocchi et al. .................... 62/343 |
| 6,010,035 A | * | 1/2000 | Estruch ........................ 222/142 |

(Continued)

FOREIGN PATENT DOCUMENTS

| CN | 201079288 Y | 7/2008 |
| DE | 101 50 908 A1 | 10/2003 |

(Continued)

*Primary Examiner* — Charles Cooley
(74) *Attorney, Agent, or Firm* — McGlew and Tuttle, P.C.

(57) ABSTRACT

A movement device, in particular for fluid or pasty products, including: a helical element (2), arranged with helical development about a longitudinal axis (x) thereof and being predisposed to rotate concentrically externally of a cooling element (100) in such a way as to push a fluid product in advancement along the longitudinal axis (x); a first connecting element (3), predisposed to reciprocally connect and maintain the turns of the helical element (2) distant from one another; a hub (4), predisposed to enable connecting the helical element (2) to a rotating element (110) predisposed to activate the helical element (2) in rotation about the longitudinal axis (x) thereof; a first frontal blade (10), arranged downstream of the helical element (2), conformed such as to push a fluid product in advancement along the longitudinal axis (x) downstream of the helical element (2).

20 Claims, 3 Drawing Sheets

(56) References Cited

U.S. PATENT DOCUMENTS

| | | | |
|---|---|---|---|
| 6,058,721 A * | 5/2000 | Midden et al. | 62/136 |
| 6,176,090 B1 * | 1/2001 | Ufema | 62/68 |
| 6,286,724 B1 * | 9/2001 | Midden | 222/153.14 |
| 6,349,852 B1 * | 2/2002 | Ford | 222/56 |
| 6,430,952 B1 * | 8/2002 | Midden et al. | 62/231 |
| 6,446,835 B1 * | 9/2002 | Ford | 222/56 |
| 6,460,368 B1 * | 10/2002 | Grande Damaso | 62/342 |
| 6,619,056 B2 * | 9/2003 | Midden et al. | 62/136 |
| 6,766,650 B2 * | 7/2004 | Cunha et al. | 62/68 |
| 6,918,258 B2 * | 7/2005 | Cunha et al. | 62/68 |
| 7,152,765 B1 * | 12/2006 | Midden et al. | 222/511 |
| 7,603,870 B2 * | 10/2009 | Mavridis et al. | 62/136 |
| 7,712,321 B2 * | 5/2010 | Kadyk | 62/136 |
| 8,561,839 B2 * | 10/2013 | Cocchi et al. | 222/1 |
| 8,887,522 B2 * | 11/2014 | Grampassi | 62/342 |
| 8,899,063 B2 * | 12/2014 | Ugolini | 62/342 |
| 9,060,527 B2 * | 6/2015 | Sipp et al. | |
| 2002/0189269 A1 * | 12/2002 | Midden et al. | 62/136 |
| 2004/0060307 A1 * | 4/2004 | Cunha et al. | 62/135 |
| 2004/0226305 A1 * | 11/2004 | Grampassi | 62/135 |
| 2008/0092580 A1 * | 4/2008 | Mavridis et al. | 62/342 |
| 2008/0098765 A1 * | 5/2008 | Bond | 62/342 |
| 2008/0202130 A1 * | 8/2008 | Kadyk | 62/68 |
| 2009/0191318 A1 * | 7/2009 | Cocchi et al. | 426/231 |
| 2012/0240611 A1 * | 9/2012 | Grampassi | 62/342 |
| 2012/0266761 A1 * | 10/2012 | Grampassi | 99/455 |
| 2012/0272834 A1 * | 11/2012 | Grampassi | 99/455 |
| 2013/0327080 A1 * | 12/2013 | Sipp et al. | 62/342 |
| 2014/0134299 A1 * | 5/2014 | Guidorzi et al. | 426/87 |
| 2014/0332560 A1 * | 11/2014 | Sipp et al. | 222/146.6 |
| 2015/0230496 A1 * | 8/2015 | Sipp | A23G 9/045 62/342 |

FOREIGN PATENT DOCUMENTS

| | | |
|---|---|---|
| EP | 1 533 023 A2 | 5/2005 |
| EP | 2862451 A1 * | 4/2015 |
| WO | WO 2011077372 A2 * | 6/2011 |

\* cited by examiner

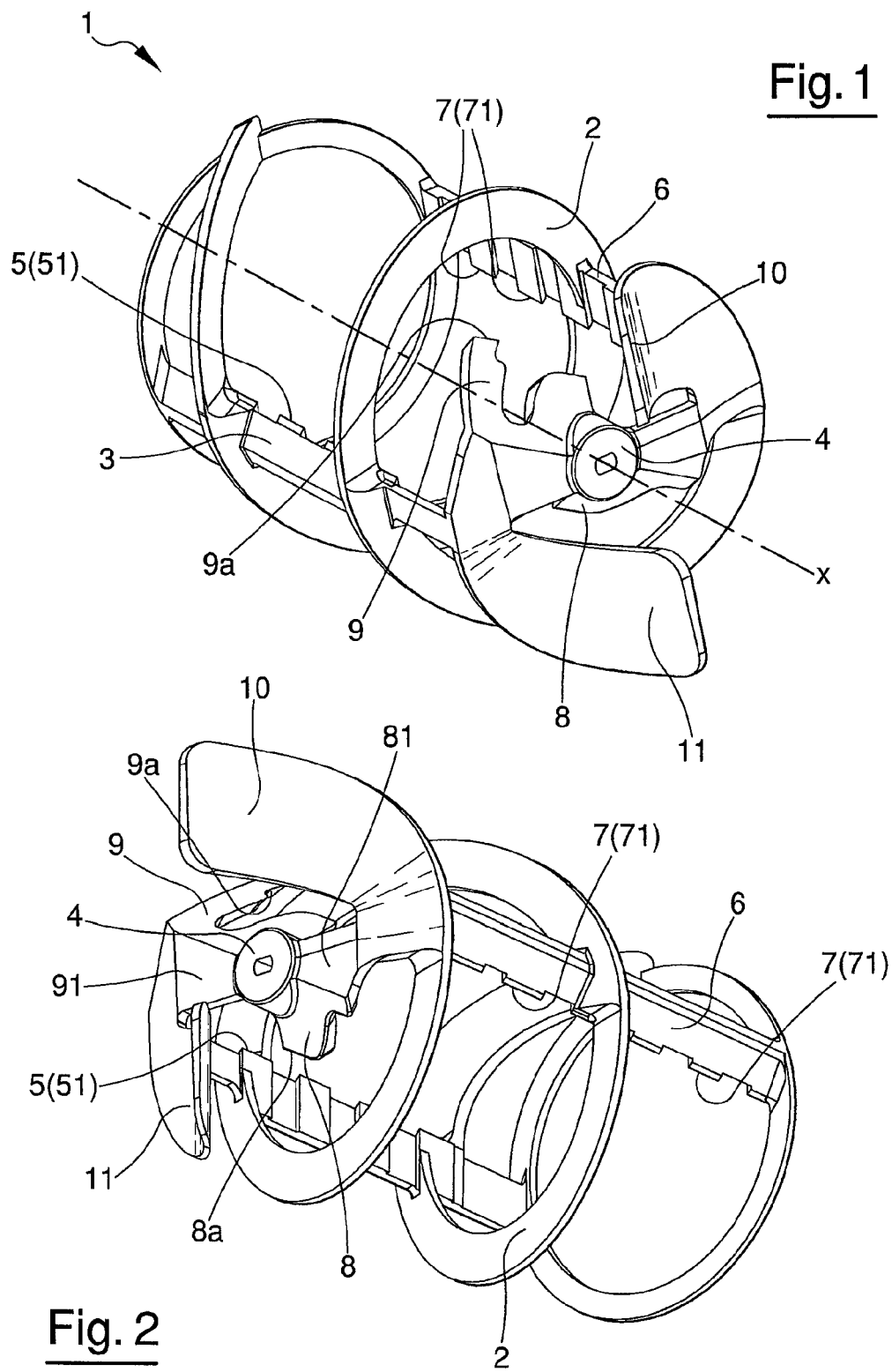

000000# MOVEMENT DEVICE INCLUDING A FRONTAL BLADE FOR MOVING PRODUCTS, IN PARTICULAR FOR FLUID AND/OR PASTY PRODUCTS

TECHNICAL FIELD

The present invention regards a movement device, in particular for fluid and/or pasty products.

BACKGROUND ART

In greater detail, the device object of the invention is particularly suitable to be used in machines predisposed for dispensing a refrigerated fluid or pasty food product, as an example water-ices or a milk and/or water based product, such as a shake, a yogurt, a cream or an ice cream.

Since the above mentioned products must be conserved at low temperatures, machines of this type generally comprise a cooling element located inside a reservoir wherein the product to be dispensed is contained. The cooling element, normally consisting of an evaporator, is contained in a cylindrical casing. The reservoir is generally equipped with a faucet, located in a front area of the same reservoir, to enable the dispensing of the product.

Machines of the known type are further equipped with a movement device which comprises a helical element, arranged with helical development around a longitudinal axis, which is predisposed to rotate concentrically externally of the cooling element. The inclination of the helix and the sense of rotation of the helical element are such as to push the fluid product in advancement along the longitudinal axis of the helical element towards the front area of the reservoir where the faucet is located for dispensing the product.

Nevertheless, the devices of the known type do not offer an efficient movement of the product. In particular, the axial push that the devices of the known type transmit to the product is rather limited, so that the dispensing of the product is often non fluid and with a reduced flow. The axial push exerted by the devices of the known type, moreover, exhausts immediately downstream of the helical element, so that, in the zone where the dispensing faucet is located, the product is subjected to an undesired stagnation.

In the machines of known type a further serious drawback is encountered. The external surface of the cooling element is in fact a seat for the formation of accumulations of ice and/or of frozen products. Normally, after a certain period of functioning of the machine, the external surface of the cooling element is covered by a layer of ice and/or of frozen product that strongly limits both the thermal exchange between the cooling element and the product, and the flow of the product contacting the cooling element. An excessive thickness of ice and/or of frozen product can further trigger an interference with the movement device which could be damaged and could also lead to the damage of the members for transmitting the rotary motion.

DISCLOSURE OF INVENTION

The scope of the present invention is to provide a movement device which allows to overcome the drawbacks that can be encountered in the prior art.

An advantage of the invention is to determine an efficient movement of the product inside the reservoir.

Another advantage of the invention is that it enables to maintain the surface of the cooling element constantly free from any accumulation of ice and/or frozen product.

BRIEF DESCRIPTION OF THE DRAWINGS

Further features and advantages of the present invention will appear clearly from the indicative, and so not limitative, description of a preferred but not exclusive embodiment of the invention, as illustrated in the attached drawings, wherein:

FIG. 1 shows a perspective view of the movement device according to the present invention;

FIG. 2 shows a second perspective view of the movement device according to the present invention;

BEST MODES OF CARRYING OUT THE INVENTION

Figure 5:
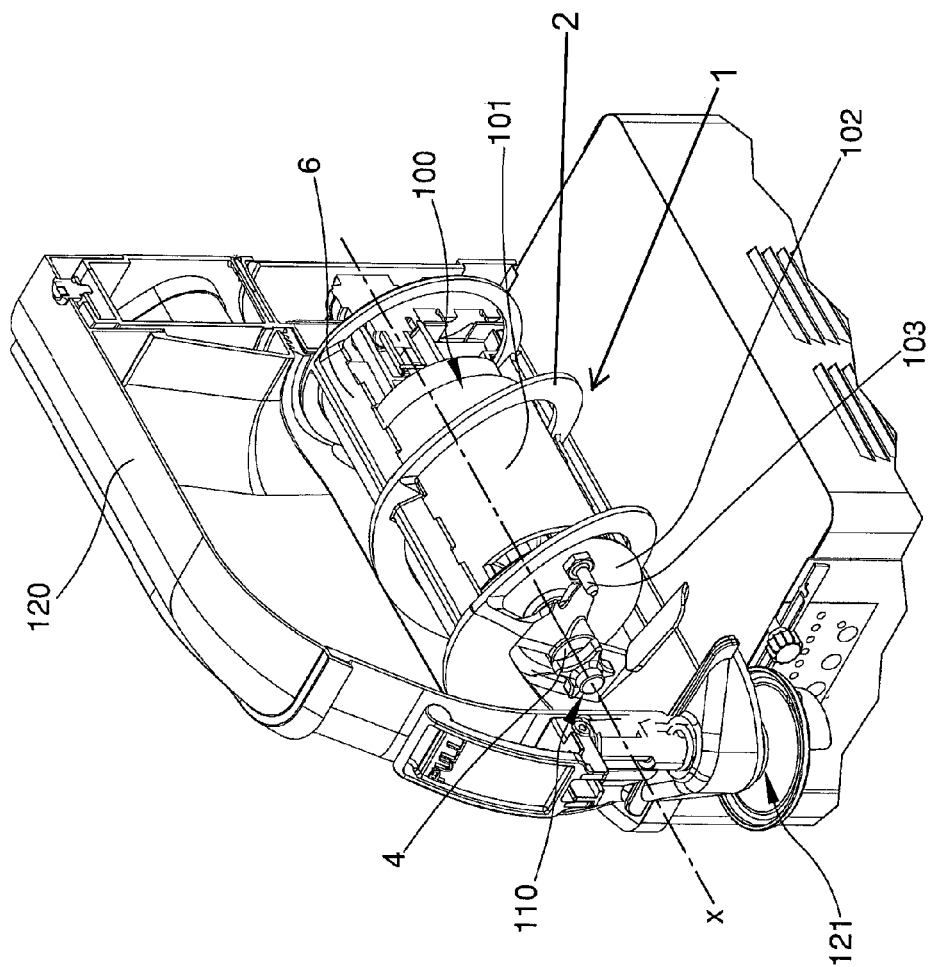
FIG. 5 shows a schematic view of the movement device according to the present invention installed in a machine for dispensing fluid and/or pasty products.

As already said, the movement device 1 object of the invention is preferably used in machines that dispense fluid and/or pasty products, for example water-ices or a milk and/or water based product, such as a shake, a yogurt, a cream or an ice cream. An example of dispenser machine is illustrated in FIG. 5. Machines of this type generally comprise a cooling element 100 located inside a reservoir 120 (represented in sectional view) wherein the product to be dispensed is contained. The cooling element 100 comprises a cylindrical wrapping which presents a peripheral cylindrical surface 101 and a front surface 102 oriented towards a front area of the reservoir 120 wherein means are positioned, typically a faucet 121, for dispensing the product.

The movement device 1 comprises a helical element 2, arranged with helical development around a longitudinal axis x and predisposed to concentrically rotate externally of a cooling element 100. The inclination of the helix and the sense of rotation of the helical element 2 are such as to push a fluid product in advancement along the longitudinal axis x, in particular towards the front area of the reservoir where the faucet 121 for dispensing the product is positioned.

A first connecting element 3 is predisposed to reciprocally connect and maintain the turns of the helical element 2 distant from one another. In a preferred embodiment of the device, the connecting element 3 is arranged parallel to the longitudinal axis x.

A hub 4 is predisposed to enable connecting the helical element 2 to a rotating element 110 predisposed to activate the helical element 2 in rotation around the longitudinal axis x thereof. The rotating element 110 can be constituted for example, but not only, by a motor shaft arranged concentrically to the cooling element 100, as represented in FIG. 5.

The movement device further comprises scraper means 5, 7, 8, 9 predisposed to drag contactingly the external surface of the cooling element 100 so as to remove accumulations and/or residues of material from said external surface. The presence of such scraper means 5, 7, 8, 9 is extremely advantageous. Accumulation of solid material on the surface of the cooling element 100, in particular of ice and/or of frozen product, hinders in fact both the flow of the product, and the thermal exchange between the product and the cooling element. The scraper means 5, 7, 8, 9 a allow to maintain the surface of the cooling element 100 always free from any accumulation of material, and particularly from ice and/or from accumulations of frozen product, so that the product is constantly cooled with high efficiency. The flow of the product turns out to be particularly fluid, so that the dispensing of the product is always ready and abundant. Furthermore, all the transmission members for the rotating motion to the movement device do not undergo any overload due to the friction of the product on the surface of the cooling element 100.

In a preferred, but not exclusive, embodiment, the scraper means comprise at least a first scraper edge 5, predisposed to drag contactingly the cylindrical peripheral surface 101 of the cooling element 100. Such a first scraper edge 5 can have a continuous development or, as can be seen in FIGS. 1 and 2, can be subdivided in a plurality of scraper edges 51 aligned and spaced from each other by predetermined pitches. In both cases, the scraper blade 5 is preferably associated with the first connecting element 3.

The movement device according to the present invention can further be provided with a second scraper edge 7 which, analogously to the first scraper edge 5, is predisposed to contactingly drag the peripheral cylindrical surface 101 of the cooling element 100. Also the second scraper edge 7 can have a continuous development or, as seen in FIGS. 1 and 2, can be subdivided in a plurality of scraper edges 71 aligned and spaced from each other by predetermined pitches. Also the second scraper edge 7, in both embodiments, is preferably associated with a second connecting element 6 predisposed to reciprocally connect and maintain the turns of the helical element 2 distant from one another. The presence of a second connecting element 6 confers a bigger resistance and bigger rigidity to the helical element 2.

In the case wherein both scraper edges 5 and 7 are subdivided in a plurality of scraper edges 51, 71, the scraper edges 51, 71 of both edges can be reciprocally staggered along the longitudinal axis x. In particular, the scraper edges 51, 71 are arranged in such a way that each scraper edge 51 of the first scraper edge 5 sweeps, in the course of its own rotation motion, a defined cylindrical surface which is placed beside at least one cylindrical surface, which does not overlap, or overlaps to a limited extent, the previous one, swept by a scraper edge 71 of the second scraper edge 7. The entire cylindrical surface 101 of the cooling element 100 is thus swept according to consecutive cylindrical strips swept by various scraper edges 51, 71. This allows to obtain an efficient scraping of the cylindrical surface 101 of the cooling element 100 limiting the stresses of each scraper edge 5, 7.

Preferably the scraper means 5, 7, 8, 9 further comprise a first frontal scraper 8, predisposed to contactingly drag the front surface 102 of the cooling element 100. As can be seen in particular in FIGS. 1, 2 and 4, a small arm 81 connects the hub 4 to the helical element 2. The first frontal scraper 8 is preferably associated with such a small arm 81 which extends between the hub 4 and the helical element 2.

Figure 3:
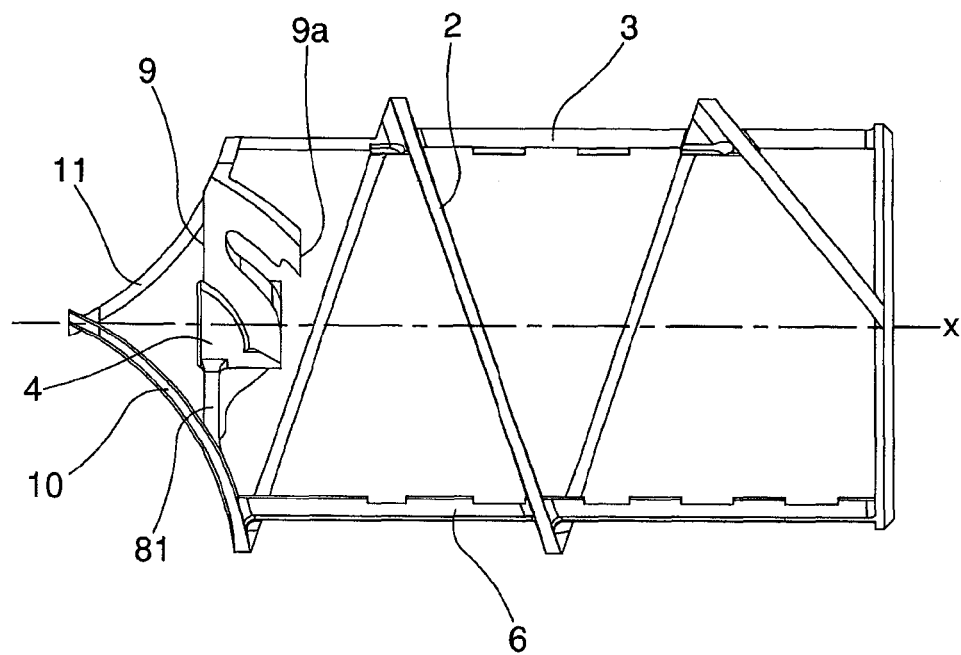
FIG. 3 shows a top view of the movement device of FIG. 1.
Figure 4:
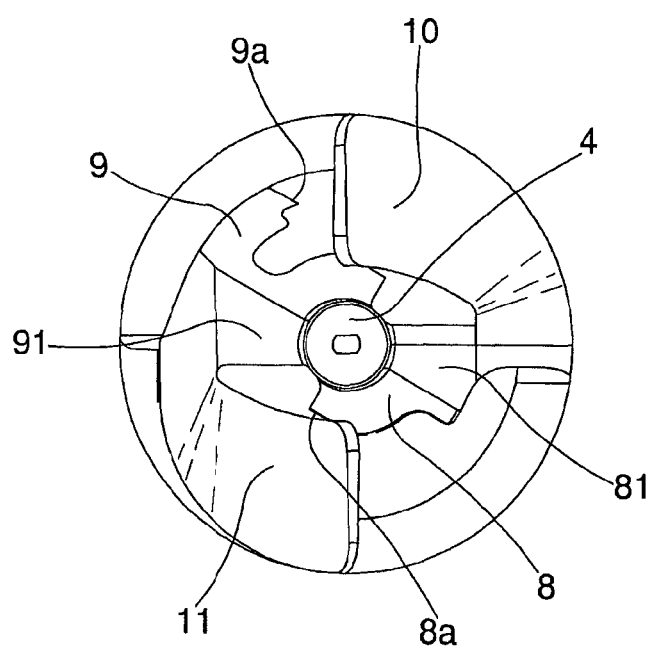
FIG. 4 shows a front view of the device of FIG. 3.

The first frontal scraper 8 comprises a scraper edge 8a shaped such as to pass very close to, but without touching, a thermometer 103 which projects in longitudinal direction from the front surface 102 of the cooling element 100. In particular, as can be seen in FIGS. 2 and 4, the scraper edge 8a has a length such as to sweep, during its own rotation motion around the longitudinal axis x, an annular ring which extends between the hub 4 and the thermometer 103.

Preferably the scraper means 5, 7, 8, 9 comprise also a second frontal scraper 9, predisposed to contactingly drag the front surface 102 of the cooling element 100. As can be seen in particular in FIGS. 1, 2 and 4, a second small arm 91 connects the hub 4 to the helical element 2. The second frontal scraper 9 is associated preferably with the second small arm 91.

Analogously to the first frontal scraper, the second frontal scraper 9 comprises a scraper edge 9a shaped such as to pass very close to, but without touching, the thermometer 103. The scraper edge 9a of the second frontal scraper 9 is arranged and shaped such as to sweep, during its own rotation motion around the longitudinal axis x, an annular ring which extends between the thermometer 103 and the external edge of the front surface 102 of the cooling element.

The combined action of the first and of the second frontal scraper 8, 9 thus enables to sweep the entire front surface 102 of the cooling element 100, except an annular ring that contains the section of the thermometer 103 and the area covered by the hub 4. The cleaning of the front surface 102 of the cooling element 100 is extremely important as it is the closest surface to the zone in which the faucet for dispensing the product is located, zone to which an efficient cooling is very important. In the same way, also the cleaning of the thermometer 103 is very important to warrant a correct detection of the temperature of the product.

The device according to the invention comprises a first frontal blade 10 arranged downstream of the helical element 2 with reference to the flow of the product. Such a first frontal blade 10 is shaped such as to push the fluid product in advancement along the longitudinal axis x downstream of the helical element 2. The presence of the first frontal blade 10 offers a supplement of push to the product downstream of the helical element, so that the flow of available product at the dispensing faucet 121 is bigger with respect to the flow made available by devices of the known type for which the pushing action on the product is limited to the sole helical element. The blade 10 further determines a positive mixing of the product in the zone in which the faucet 121 is located.

From a constructive point of view the first frontal blade 10 extends from a peripheral portion of the movement device towards the longitudinal axis x. As can be seen in figures from 1 to 4, the first frontal blade 10 is connected to the end portion of the helical element 2 and to the first small arm 81. The blade extends away from the helical element 2 with a preferably curved development the concavity of which is facing externally. The blade further presents a free end which is located in proximity of a median plane of the helical element 2.

To further increase the push on the product and the flow of product supplied to the faucet 121, the device 1 can be provided with a second frontal blade 11, arranged downstream of the helical element 2, shaped as well such as to push a fluid product in advancement along the longitudinal axis x downstream of the helical element 2.

Also the second frontal blade 11 extends from a peripheral portion of the movement device 1 towards the longitudinal axis x and has a curved development with concavity facing externally. As can be seen in figures from 1 to 4, in analogy with the first frontal blade 10, the second frontal blade 11 is connected to the second small arm 91 and has a free end that is located in proximity of a median plane of the helical element 2. Preferably, the free ends of both frontal blades are aligned on a median plane of the helical element 2. In a preferred embodiment, both frontal blades are reciprocally symmetrical with respect to the longitudinal axis x of the device 1.

As already said, the conformation of both frontal blades is such as to push the product towards the front zone of the reservoir 120 and towards the faucet 121. In particular, the front blades are shaped such as to push the product towards the zone for entering the faucet 121. This determines a constant and abundant supply of product to the faucet 121, so that the dispensing of the product is always ready and continuous.

Preferably, the frontal blades are further shaped such that the free ends of the same blades come very close to the front wall of the reservoir 120. Such a conformation of the frontal blades allows to remove any possible accumulation of product from the front surface of the reservoir, so that the product, also by effect of the remixing induced by the frontal blades, is always maintained in an optimal conservation state.

The invention claimed is:

1. A movement device in combination with a cooling element, the movement device comprising:
a helical element, arranged with a helical development about a longitudinal axis thereof and said helical element being predisposed to rotate concentrically externally of the cooling element in such a way as to push a fluid product in advancement along the longitudinal axis;
a first connecting element, predisposed to reciprocally connect and maintain turns of the helical element distant from one another;
a hub, predisposed to enable connecting the helical element to a rotating element predisposed to activate the helical element in rotation about the longitudinal axis thereof;
a first frontal blade, arranged downstream and extending away of the helical element, conformed such as to push the fluid product in advancement along the longitudinal axis downstream of the helical element, wherein the first frontal blade extends from a peripheral portion of the movement device towards the longitudinal axis and said first frontal blade comprises a curved development with a concavity facing externally.

2. A device of claim 1, further comprising:
a second frontal blade, arranged downstream of the helical element, conformed in such a way as to push the fluid product in advancement along the longitudinal axis downstream of the helical element.

3. A device of claim 2, wherein the second frontal blade extends from a peripheral portion of the movement device towards the longitudinal axis and said second frontal blade exhibits a curved development with a concavity facing externally.

4. A device of claim 1, further comprising:
a scraper means for dragging contactingly on an external surface of the cooling element such as to remove accumulations and/or residues of material from said external surface.

5. A device of claim 4, wherein said scraper means comprises at least a first scraper edge, which is predisposed to drag contactingly on a peripheral cylindrical surface of the cooling element.

6. A device of claim 5, wherein the first scraper edge is sub-divided into a plurality of scraper edges.

7. A device of the claim 6, wherein the first scraper edge is associated with the first connecting element.

8. A device of the claim 5, wherein the first scraper edge is associated with the first connecting element.

9. A device of claim 5, wherein said scraper means comprises a second scraper edge predisposed to drag contactingly on the peripheral cylindrical surface of the cooling element.

10. A device of claim 9, wherein the second scraper edge is sub-divided into a plurality of scraper edges.

11. A device of claim 10, further comprising:
a second connecting element predisposed to reciprocally connect and maintain the turns of the helical element distanced from one another, the second scraper edge being associated with the second connecting element.

12. A device of claim 9, further comprising:
a second connecting element predisposed to reciprocally connect and maintain the turns of the helical element distanced from one another, the second scraper edge being associated with the second connecting element.

13. A device of claim 4, wherein the scraper means comprises a first frontal scraper, predisposed to drag contactingly on a front surface of the cooling element.

14. A device of claim 13, wherein the first frontal scraper comprises a scraper edge shaped in such a way as to pass very close to, but without touching, a thermometer which projects in a longitudinal direction from the front surface of the cooling element.

15. A device of claim 14, wherein the first frontal scraper is associated with the hub.

16. A device of claim 13, wherein the first frontal scraper is associated with the hub.

17. A device of claim 13, wherein the scraper means comprises a second frontal scraper, predisposed to contactingly drag on the front surface of the cooling element.

18. A device of claim 17, wherein the second frontal scraper comprises a scraper edge shaped such as to pass very close to, but without touching, a thermometer which projects in a longitudinal direction from the front surface of the cooling element.

19. A device of claim 1, further comprising:
a second frontal blade, arranged downstream of the helical element, conformed in such a way as to push the fluid product in advancement along the longitudinal axis downstream of the helical element.

20. A movement device in combination with a cooling element, the movement device comprising:
a helical element, arranged with a helical development about a longitudinal axis thereof and said helical element being predisposed to rotate concentrically externally of the cooling element in such a way as to push a fluid product in advancement along the longitudinal axis, said helical element comprising an end portion;
a first connecting element, predisposed to reciprocally connect and maintain turns of the helical element distant from one another;
a hub, predisposed to enable connecting the helical element to a rotating element predisposed to activate the helical element in rotation about the longitudinal axis thereof;
a first arm connecting the hub to the helical element;
a first frontal blade connected to the first arm and the end portion of the helical element, said first frontal blade being arranged downstream and extending away from the helical element, conformed such as to push the fluid product in advancement along the longitudinal axis downstream of the helical element, said first front blade defining a free end located adjacent to a median plane of said helical element.

* * * * *